United States Patent
Moreno et al.

(10) Patent No.: US 7,463,023 B1
(45) Date of Patent: Dec. 9, 2008

(54) NON-CONTACTING ROTARY AND LINEAR TRAVEL SENSOR

(75) Inventors: Daniel J. Moreno, El Paso, TX (US); Yingjie Lin, El Paso, TX (US); Susan A. Maxwell, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/832,962

(22) Filed: Aug. 2, 2007

(51) Int. Cl.
*G01B 7/30* (2006.01)
*G01B 7/14* (2006.01)
*G01R 33/07* (2006.01)
*G01R 33/09* (2006.01)

(52) U.S. Cl. ............... 324/207.25; 324/207.2; 324/207.21; 324/207.24; 324/251; 324/252

(58) Field of Classification Search ............ 324/207.11, 324/207.13, 207.2, 207.21, 207.24–207.25, 324/173–174, 249, 251–252; 338/32 R, 338/32 H; 73/514.31, 514.39
See application file for complete search history.

(56) References Cited

U.S. PATENT DOCUMENTS

| | | | |
|---|---|---|---|
| 6,424,896 B1 | 7/2002 | Lin et al. | |
| 6,576,890 B2 | 6/2003 | Lin et al. | |
| 6,822,441 B1 | 11/2004 | Moreno et al. | |
| 6,836,111 B2 | 12/2004 | Moreno et al. | |
| 6,876,194 B2 | 4/2005 | Lin et al. | |
| 6,998,838 B2 | 2/2006 | Lin | |
| 7,151,369 B1 * | 12/2006 | Wolf | 324/207.24 |
| 2004/0164727 A1 | 8/2004 | Lin | |

* cited by examiner

*Primary Examiner*—Bot LeDynh
(74) *Attorney, Agent, or Firm*—Paul L. Marshall

(57) ABSTRACT

A non-contacting, magnet-based, rotary and linear travel absolute position sensor each include a stationary galvanomagnetic sensing element disposed in an air gap or slot of a movable magnet/flux concentrator assembly. The assembly has a first flux concentrator comprising ferromagnetic material having opposing magnet ends, and a second flux concentrator also comprising ferromagnetic material having opposing magnet ends but that is spaced apart from the first flux concentrator by a pair of magnets to form the air gap or slot. The magnet ends of each flux concentrator have a respective magnet area configured to engage a corresponding magnet and is configured in size and shape to cover the magnet. Additionally, the flux concentrators are configured in geometry to decrease in cross-sectional area from the inboard side of the magnet ends towards the center region of the concentrators, specifically the center of travel together provide improved linearity and signal to noise ratio of the output position signal.

15 Claims, 3 Drawing Sheets

NON-CONTACTING ROTARY AND LINEAR TRAVEL SENSOR

TECHNICAL FIELD

The present invention relates generally to improvements in position sensors and more particularly to non-contacting rotary and linear travel sensors.

BACKGROUND OF THE INVENTION

Angular and linear absolute position sensors are widely used in automatic control systems as feedback-sensing devices in one or more control loops of the system. In the automotive industry, such position information may be used in substitution of more traditional, conventional control feedback provided by mechanical linkages, such as cables, rods, and the like.

For example, in the automotive field, it may be desirable to know the linear absolute position of a long travel mechanism, such as a rack and pinion mechanism (i.e., that moves when a driver of an automotive vehicle turns the steering wheel), or the position of a sliding door on a minivan. In the first example, a linear absolute position sensor can provide information as to the linear position of the rack and pinion mechanism, which corresponds to the orientation of the front wheels (i.e., the steering wheels) of the automotive vehicle. In the second example, it may be desirable to know exactly where the sliding door is positioned within the long travel between a completely closed position and a completely open position. There are many other examples in and outside of the automotive industry where a linear absolute position or a rotary (angular) absolute position is detected and used.

One approach to implementing non-contacting rotary and linear absolute position sensors is magnet-based and uses flux concentrators. In this conventional approach, it is known to also use Hall Effect sensing technology. The flux concentrators are used to increase measurement angles in rotary position sensors, increase the measurement range in linear travel sensors, and/or improve linearity of the magnetic response. One drawback, however, to this conventional approach results from the magnetic hysteresis associated with the flux concentrators. In particular, in view of conventionally used geometries for flux concentrators, the magnetic flux flowing through the concentrators changes with travel, and the sensor incurs an error (non-linearity) from the concentrator's magnetic hysteresis. As a result, flux concentrators of conventional design may require very accurate dimensioning and positioning.

U.S. Patent Application Publication No. 2004/0164727 A1 entitled "SINGLE MAGNET LINEAR POSITION SENSOR" discloses a sensor assembly for measuring linear position that includes a ferromagnetic flux concentrator, a magnet, and a galvanomagnetic sensing element such as a Hall Effect or magnetoresistive sensor.

In view of the foregoing, there is a need to provide a non-contact position sensor for rotary or linear travel that minimizes or eliminates one or more of the shortcomings referred to above.

SUMMARY OF THE INVENTION

One advantage of the present invention is that it provides a magnetic circuit that does not change the magnetic field through the flux concentrators while providing a large detection angle and/or linear travel measurement. The flux concentrators in the magnetic circuit have a shape that is configured to increase the flux intensity to higher levels for an improved signal-to-noise ratio and detection range, and to provide a more linear magnetic response signal as a function of position.

A non-contacting sensor is provided in both linear position and rotary position embodiments, and each generally includes a galvanomagnetic sensing element for sensing magnetic flux passing therethrough, and a magnet/flux concentrator assembly. In general, the sensing element and the magnet/flux concentrator assembly are configured to move one with respect to the other. In one embodiment, the sensing element is stationary and the magnet/flux concentrator assembly is movable, although it should be understood that an opposite configuration, in an alternate embodiment, would achieve the same result (i.e., the sensing element and the magnet/flux concentrator assembly moving one with respect to the other). The assembly includes (i) a first magnetic flux concentrator comprising ferromagnetic material and having opposing first magnet ends, and (ii) a second magnetic flux concentrator also comprising ferromagnetic material and having opposing second magnet ends. The second flux concentrator is spaced apart from the first flux concentrator by a pair of magnets to define an air gap or slot in which is disposed the galvanomagnetic sensing element.

The flux concentrators each have respective magnet surfaces near (or at) the magnet ends configured to engage the pair of magnets. The magnet surfaces have respective magnet areas configured (e.g., in size and shape) to substantially cover the pair of magnets. The flux concentrators are further configured to have a reduced cross-sectional area, compared to the magnet areas, when taken at points in between or intermediate the magnet ends (e.g., in the central region of the flux concentrators corresponding to the center of its travel range). As described above, the sensing element is configured to be stationary while the flux concentrator assembly is configured to be movable relative to the sensing element. During movement of the magnet/flux concentrator assembly, the stationary sensing element traverses a detection range within the slot. The sensing element (e.g., Hall Effect) is configured to provide an output signal indicative of a position of the assembly as it moves relative to the stationary sensing element.

In the linear position sensor embodiment, each flux concentrator extends along a respective longitudinal axis and each includes a respective central portion in between the magnet ends. Each flux concentrator, in one embodiment, tapers from the opposing magnet ends towards the respective central region. This geometry provides for an improved linearity magnetic response signal relative to the travel of the assembly.

In the rotary position sensor embodiment, each flux concentrator extends along a respective arc and each includes a respective central region intermediate the magnet ends. Each flux concentrators has a reduced area central region as compared to the magnet area at the magnet ends. This geometry provides for an improved linearity magnetic response signal relative to the travel of the assembly.

Other features and aspects of the invention are also presented.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
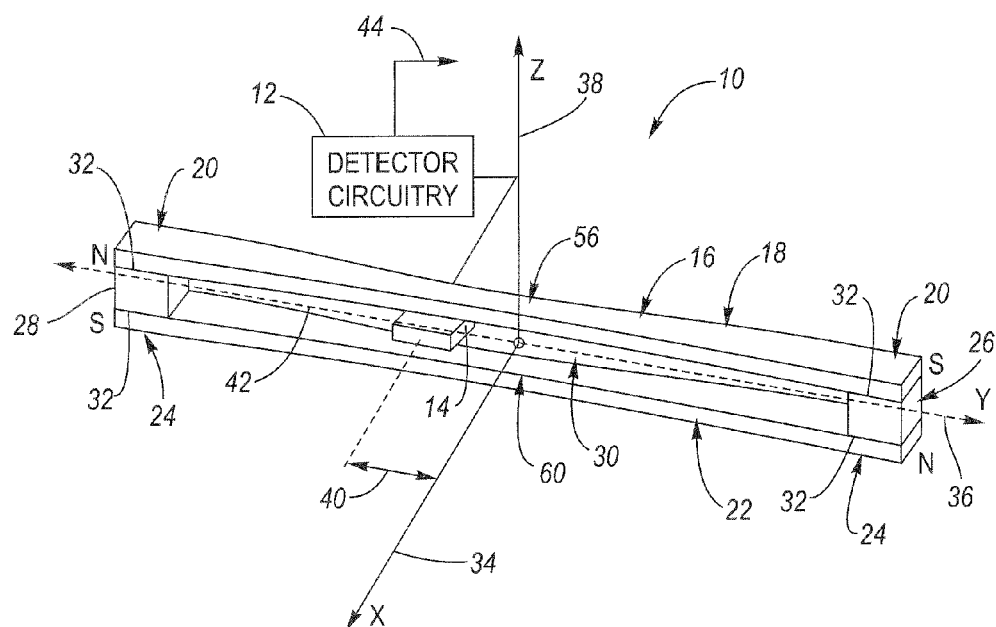
FIG. 1 is a simplified isometric view of a linear position sensor embodiment of the present invention.

Referring now to the drawings wherein like reference numerals are used to identify identical components in the various views, FIG. 1 is a simplified isometric view of a linear position sensor 10 of the present invention. Sensor 10 is configured to cooperate with a detector circuit 12. The sensor 10 includes a galvanomagnetic sensing element 14 configured to sense the magnetic flux passing therethrough, and magnet/flux concentrator assembly 16. In general, the sensing element 14 and the magnet/flux concentrator assembly 16 are configured to move one with respect to the other. In the illustrated embodiment, however, sensing element 14 is stationary while assembly 16 is configured to be movable with respect to sensing element 14. It should be understood, however, that this configuration may be reversed such that the sensing element 14 is movable and the assembly 16 is stationary, with the same effect of one "moving" with respect to the other. Sensing element 14 may comprise conventional magnetic flux sensing components, and may comprise a Hall Effect sensor, an MR sensor or other types, as known. Sensing element 14 is electrically connected to detector circuitry 12 in accordance with principles known in the art to process a linear or near-linear signal from sensing element 14 indicative of position. That is, sensing element 14 is of the type that generates an electrical output signal that is proportional to the magnetic flux density that flow through the sensing element 14 in a predetermined direction, which in the embodiment of FIG. 1 is in the z-axis direction.

Movable magnet/flux concentrator assembly 16 includes a first magnetic flux concentrator 18 comprising ferromagnetic material and having opposing first magnet ends 20, a second magnetic flux concentrator 22 also comprising ferromagnetic material and having opposing second magnet ends 24, and a pair of magnets 26, 28. Second flux concentrator 22 is spaced apart from first flux concentrator 18 by the pair of magnets 26, 28 to define an air gap or slot 30 in which sensing element 14 is disposed. Flux concentrators 18, 22 each have magnet surfaces 32 located proximate or near respective first and second magnet ends 20 and 24. Magnet surfaces 32 are configured to engage the pair of magnets 26 and 28 in a manner described in greater detail below.

FIG. 1 also shows, for frame of reference, an X-axis 34, a Y-axis 36 and a Z-axis 38. In the linear travel position sensor 10, first flux concentrator 18 extends generally along a first longitudinal axis (e.g., the Y-axis 36), and second flux concentrator 22 also extends generally along a second longitudinal axis, preferably the same axis as first flux concentrator 18 (i.e., Y-axis 36). Also, FIG. 1 shows that magnet 26 is arranged in a first magnetic orientation (N-S as taken in the positive Z-axis direction), while magnet 28 is arranged in a second magnetic orientation (S-N) that is of opposite magnetic polarity as compared to magnet 26. This arrangement of magnetic orientations for magnets 26, 28 provides a magnetic response signal that is symmetric relative to the center line of magnet/concentrator assembly 16.

As described above, sensing element 14 is preferably stationary while assembly 16 moves. In FIG. 1, for example, assume the starting position of assembly positions sensing element 14 on the origin (i.e., X-axis, Y-axis and Z-axis are all zero). When assembly 16 moves to the right a linear travel distance, corresponding to distance 40 on FIG. 1, the magnetic flux is driven from the magnets 26, 28 to sensing element 14 as it sweeps along a linear travel path 42. Sensing element 14 and circuit 12 cooperate so as to produce a linear position signal 44 indicative of the linear travel position 40. The present invention is characterized by an increased linearity and improved signal-to-noise ratio (due to increased magnetic flux intensity) as compared to conventional approaches.

Figure 2:
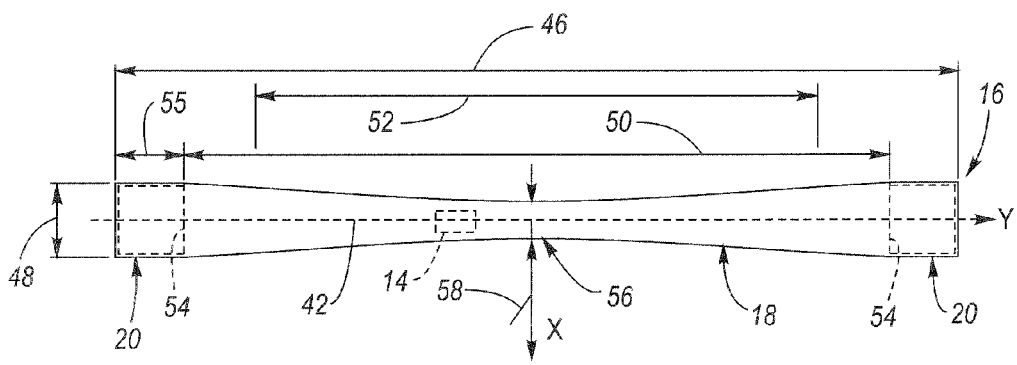
FIG. 2 is a top, plan view of the linear position sensor of FIG. 1, illustrating the geometry of the flux concentrator.

FIG. 2 is a top plan view of the linear position sensor of FIG. 1, illustrating the geometry of the magnet/flux concentrator assembly 16. Flux concentrator 18 has an overall length 46 and depth 48. In the illustrated embodiment, air gap or slot 30 includes an overall length 50; however, for improved linearity, assembly 16 is configured to provide a maximum travel/detection range 52 that is less than the overall slot length 50. A flux concentrator in accordance with the invention is also characterized by a shape that provides a linear magnetic response signal relative to assembly 16 travel.

In this regard, magnet surfaces 32 of each flux concentrator have magnet areas 54 that are configured (e.g., in size and shape) to cover magnets 26, 28 at the magnet ends 20, 24. Magnet areas 54 are shown in dashed-line format in FIG. 2 and corresponds substantially to the product of depth 48 and length 55. This feature provides improved linearity and signal strength. Additionally, in the illustrated embodiment, first flux concentrator 18 (top) includes a first central region 56 located in between first magnet ends 20. First flux concentrator 18 has a reduced cross-sectional area, designated 58, in first central region 56 as compared to first magnet area 54. Preferably, as shown, the first flux concentrator is configured so as to taper in a reducing cross-sectional area fashion from the inboard side of magnet ends 20 towards central region 56. The center of travel position (Y-axis equals zero) corresponds to the smallest cross-sectional area. Still more preferably, the taper may comprise a radius. Second flux concentrator 22 is preferably symmetric with respect to first flux concentrator 18, and thus also has a central region 60, and the size and shape as described above in connection with flux concentrator 18.

Figure 3:
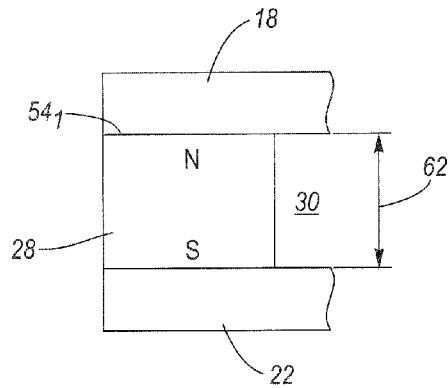
FIG. 3 is a simplified, fragmented view of a magnet end of the magnet/flux concentrator assembly illustrating a first magnet engagement area and a first slot height.
Figure 4:
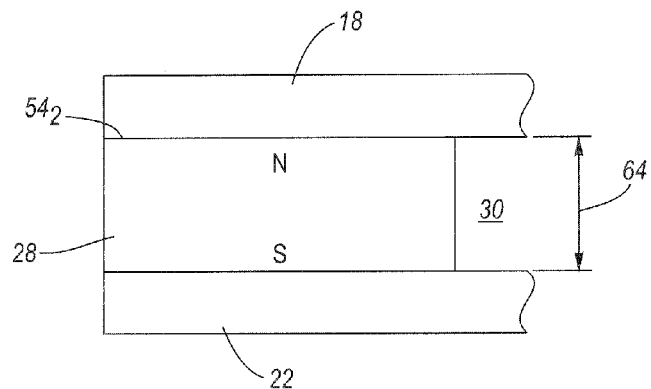
FIG. 4 is a simplified, fragmented view of a magnet end of the magnet/flux concentrator assembly illustrating a second, larger magnet engagement area and second, smaller slot height, for improved performance.

FIGS. 3-4 are simplified, fragmented views of a magnet end of a flux concentrator assembly illustrating first (smaller) and second (larger) magnet engagement areas and first (larger) and second (smaller) air gap or slot heights between concentrators. FIG. 3 shows a first magnet area 54, that is smaller than a second magnet area 542 shown in FIG. 4. Likewise, FIG. 3 shows a first air gap or slot height 62 of slot 30 that is larger than the air gap 64 in FIG. 4. Signal strength and detection range may be improved by using larger magnets (magnet areas) and smaller air gaps between the flux concentrators, as illustrated in FIGS. 3-4.

Figure 5:
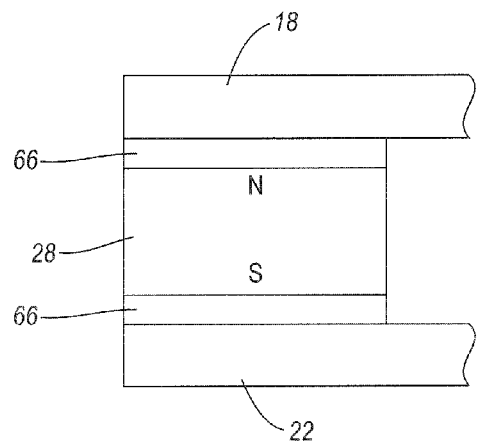
FIG. 5 is a simplified, fragmented view of a magnet end of the magnet/flux concentrator assembly illustrating the use of non-ferrous shims between a magnet and the flux concentrators.

FIG. 5 is a simplified, exaggerated view of a magnet end of a flux concentrator assembly illustrating the use of non-ferrous shims between a magnet and the flux concentrators. Linearity may be improved by a small gap that may be provided by non-ferrous shims 66 between the magnet and the flux concentrator.

Figure 6:
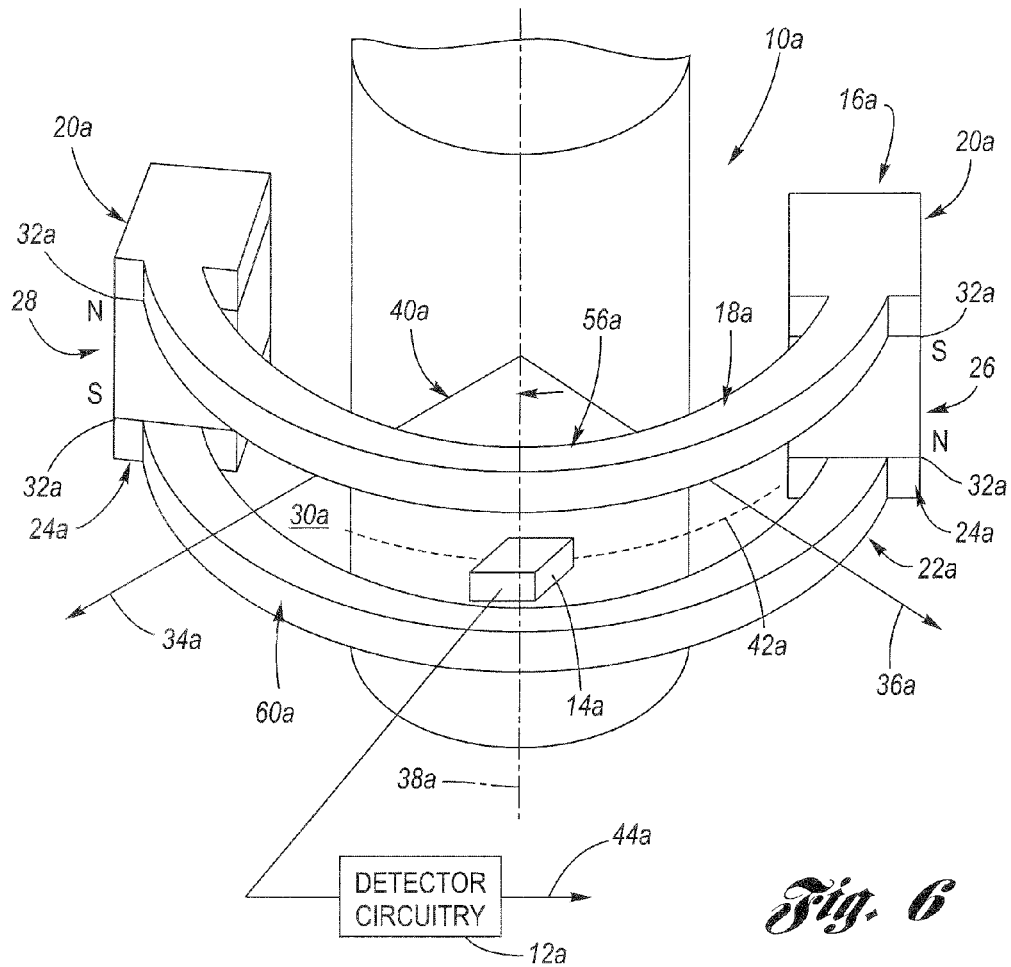
FIG. 6 is a simplified isometric view of a rotary travel, angular position sensor embodiment of the present invention.

FIG. 6 is a simplified, isometric view of an angular position sensor 10a in accordance with the present invention. Sensor 10a includes many of the same general features as sensor 10. Corresponding reference numerals for sensor 10a include the suffix "a".

Sensor 10a is configured to generate an electrical signal 44a indicative of an angular, rotary travel position 40a of assembly 16a. Assembly 16a is configured to move with respect to preferably stationary sensing element 14a. Assembly 16a is configured specifically to move in rotation about axis 38a, wherein sensor 14a sweeps a path 42a. Each flux concentrator 18a, 22a comprises ferromagnetic material and is formed in the shape of a partial ring, as shown. Rotary absolute position sensor 10a includes magnet ends 20a, 24a that include respective magnet areas 54a that are configured to substantially cover the pair of magnets 26a, 28a, as described above. Additionally, each flux concentrator is configured to decrease to a smaller cross-sectional area (from the magnet area 54a) towards first and second center regions 56a, 60a.

Figure 7:
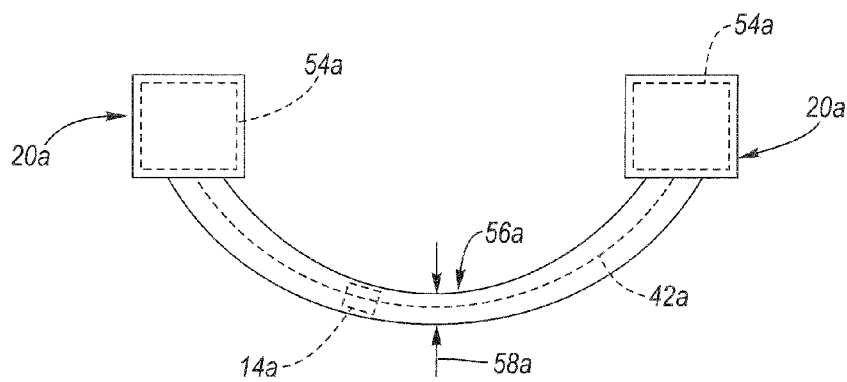
FIG. 7 is a top plan view of the angular position sensor of FIG. 6 illustrating the geometry of the flux concentrator.

FIG. 7 is a top, plan view of the angular position sensor 10a of FIG. 6, illustrating the geometry thereof. First ring flux concentrator 18a extends along a first arc corresponding to the travel path 42a) and includes a first central region 56a in between first magnet ends 20a. First ring flux concentrator 18a has a reduced cross-sectional area 58a in the first central region 56a taken at points in central region 58a as compared to magnet area 54a. Likewise, second ring flux concentrator 22a extends along a second arc 42a and includes a second central region 60a (best shown in FIG. 6) in between magnet ends 24a. Preferably, the first and second arcs are in registration with each other and therefore aligned. Second ring flux concentrator 22a has a reduced cross-sectional area taken at points in second central region 60a. First ring flux concentrator 18a and second ring flux concentrator 22a may, in an alternate embodiment, taper in a reducing cross-sectional area fashion along arc 42a from the inboard side of magnet ends 20a, 24a, toward respective central regions 56a, 60a with the center of travel position having the smallest cross-sectional area. The ring flux concentrators are preferably symmetric.

It should be understood that in all respects, other than the particular geometry and function of angular position (rather than linear position) described above, sensor 10a embodies the same principles as sensor 10 described in connection with FIGS. 1-5.

It should be appreciated that the geometry of the flux concentrators, the geometry of the air gap or slot, the magnet geometry, and the sensor technology all contribute to the performance of any constructed embodiment. It should be understood that variations are possible to optimize or otherwise tailor the sensor response signal for a variety of linear and rotary absolute position applications, and yet remain within the spirit and scope of the present invention.

While particular embodiments of the invention have been shown and described, numerous variations and alternate embodiments will occur to those skilled in the art. Accordingly, it is intended that the invention be limited only in terms of the appended claims.

The invention claimed is:

1. A non-contacting sensor comprising:
a galvanomagnetic sensing element for sensing magnetic flux passing therethrough;
an assembly including (i) a first magnetic flux concentrator comprising ferromagnetic material having opposing first magnet ends; (ii) a second magnetic flux concentrator comprising ferromagnetic material having opposing second magnet ends, said second concentrator being spaced apart from said first concentrator by a pair of magnets to define a slot in which said sensing element is disposed, said concentrators each having magnet surfaces proximate said first and second magnet ends configured to engage said pair of magnets, said magnet surfaces having respective magnet areas configured to cover said magnets, said concentrators being configured to have a reduced cross-sectional area compared to said respective magnet areas taken at points intermediate said magnet ends, said assembly and said sensing element being movable with respect to each other such that said sensing element sweeps through said slot; and
said sensing element being configured to provide an output signal indicative of a position of said assembly as said assembly moves, said reduced cross-sectional area being configured to cause said output signal to be substantially linear as said sensing element sweeps through said slot.

2. The sensor of claim 1 wherein said first flux concentrator extends along a first longitudinal axis and includes a first central region in between said first magnet ends, said first flux concentrator having a reduced cross-sectional area in said first central region as compared to said first magnet area, and wherein said position comprises a linear position of said sensing element relative to said assembly.

3. The sensor of claim 2 wherein said second flux concentrator extends along a second longitudinal axis and includes a second central region between said second magnet ends, said second flux concentrator having a reduced cross-sectional area taken at said second central region as compared to said second magnet area.

4. The sensor of claim 3 wherein said first flux concentrator tapers in a reducing fashion along said first longitudinal axis from said first magnet ends toward said first central region.

5. The sensor of claim 4 wherein said second flux concentrator tapers in a reducing fashion along said second longitudinal axis from said second magnet ends toward said second central region.

6. The sensor of claim 1 wherein one of said pair of magnets engages said first flux concentrator in a first magnetic orientation, and the other of said pair of magnets engages said first flux concentrator in a second magnetic orientation of opposite polarity with respect to said first magnetic orientation.

7. The sensor of claim 1 wherein a travel distance of a travel path swept by said sensing element is less than a slot length of said slot.

8. The sensor of claim 1 wherein said assembly further includes a non-ferrous shim between said pair of magnets and at least one of said concentrators.

9. The sensor of claim 1 wherein said first flux concentrator extends along a first arc and includes a first central region between said first magnet ends, said first flux concentrator having a reduced cross-sectional area in said first central region as compared to said first magnet area, and wherein said position comprises an angular position of said sensing element relative to said assembly.

10. The sensor of claim 9 wherein said second flux concentrator extends along a second arc and includes a second central region between said second magnet ends, said second flux concentrator having a reduced cross-sectional area taken at said second central region as compared to said second magnet area.

11. The sensor of claim 10 wherein said first flux concentrator tapers in a reducing fashion along said first arc from said first magnet ends toward said first central region.

12. The sensor of claim 11 wherein said second flux concentrator tapers in a reducing fashion along said second arc from said second magnet ends toward said second central region.

13. The sensor of claim 1 wherein said galvanomagnetic sensing element comprises a sensing element selected from the group comprising a Hall Effect sensor and a magnetoresistive (MR) sensor.

14. The sensor of claim 1 wherein said sensing element is stationary and said assembly is movable.

15. The sensor of claim 1 wherein said sensing element is movable and said assembly is stationary.

* * * * *